Nov. 24, 1959  I. A. GREENWOOD, JR., ET AL  2,914,763
DOPPLER-INERTIAL NAVIGATION DATA SYSTEM
Filed Nov. 5, 1953  3 Sheets-Sheet 1

INVENTOR.
IVAN A. GREENWOOD, Jr.
FRANCE B. BERGER
BY
H. A. Mackey
ATTORNEY

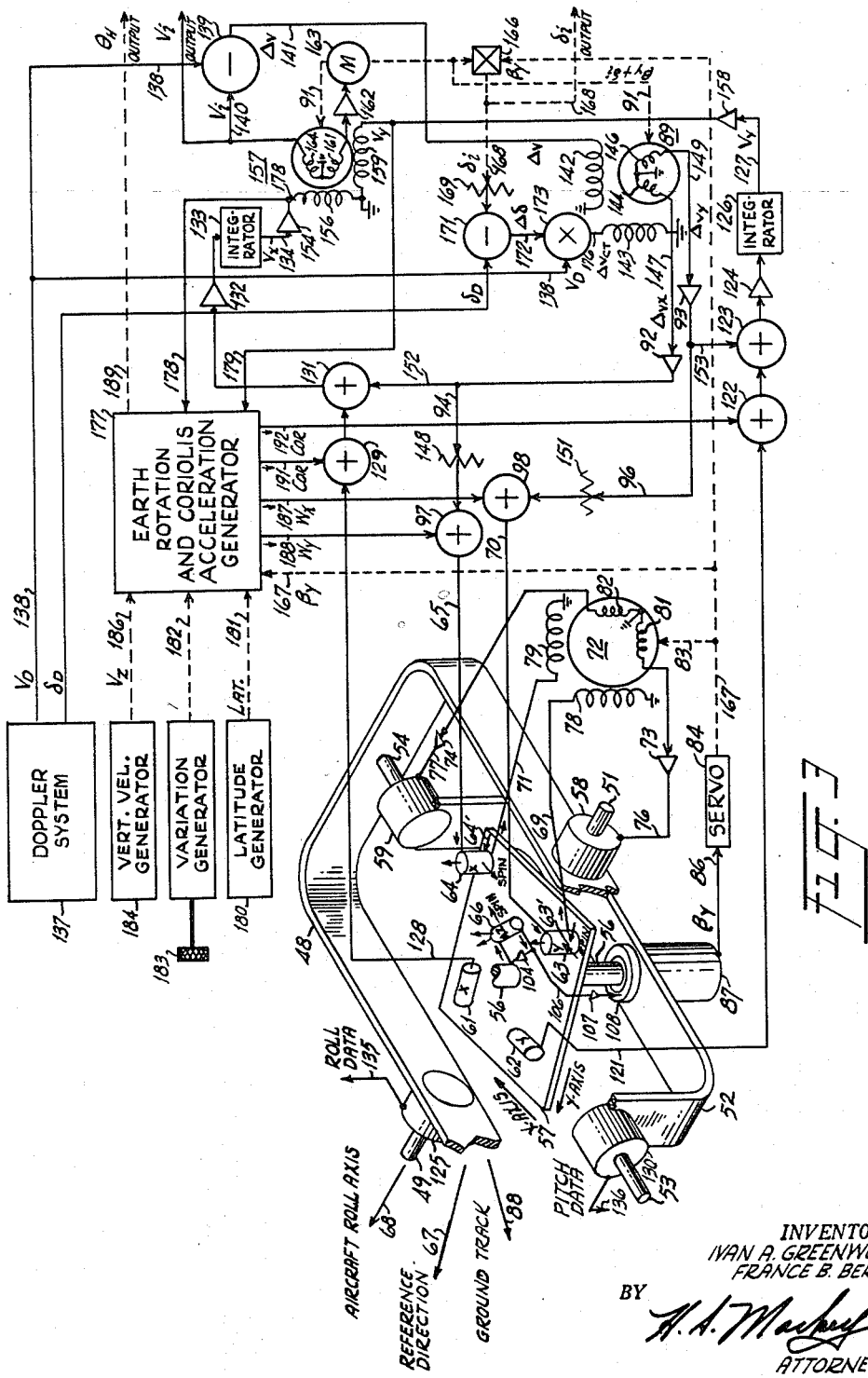

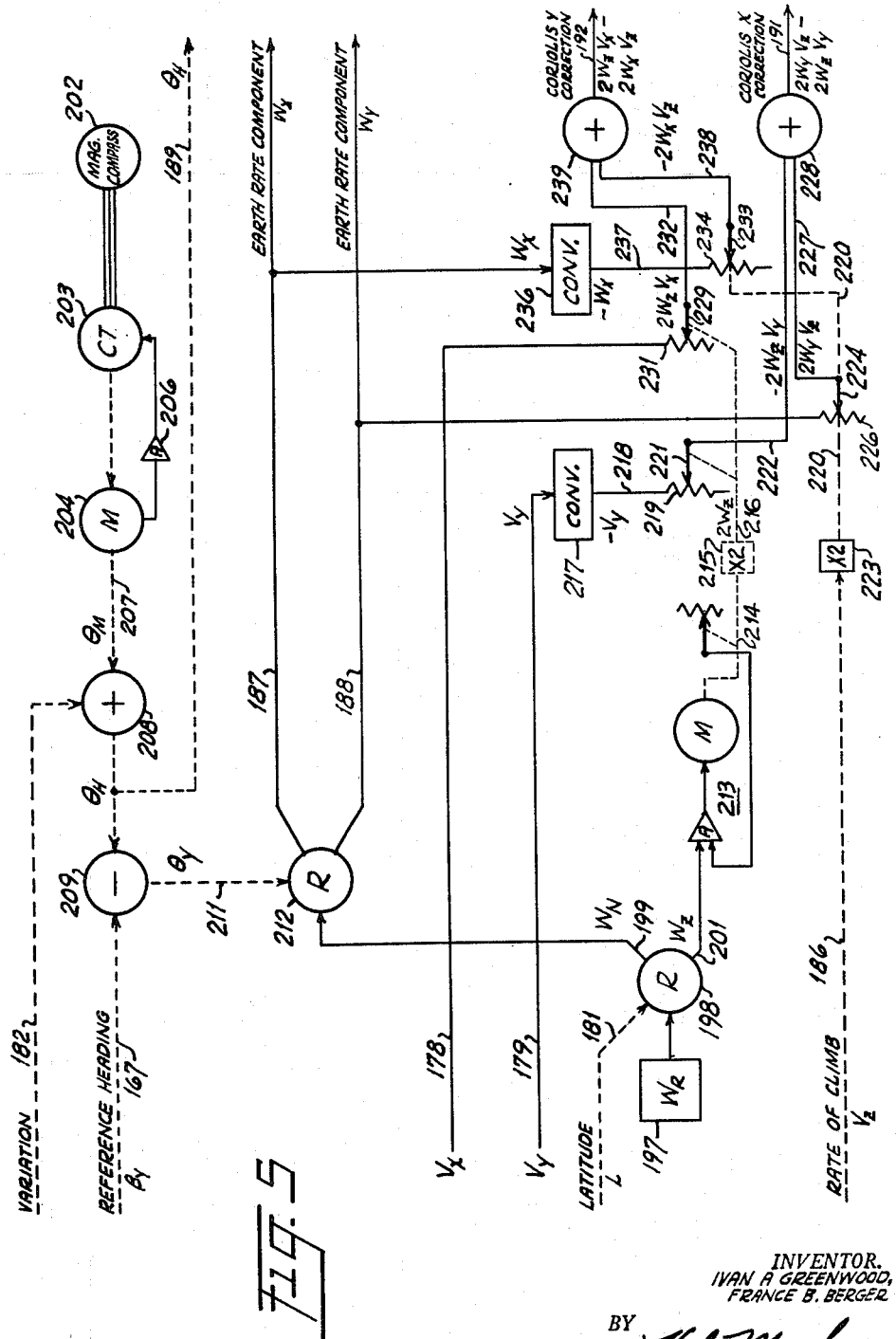

United States Patent Office 2,914,763
Patented Nov. 24, 1959

2,914,763

DOPPLER-INERTIAL NAVIGATION DATA SYSTEM

Ivan A. Greenwood, Jr., and France B. Berger, Pleasantville, N.Y., assignors to General Precision Laboratory Incorporated, a corporation of New York Application November 5, 1953, Serial No. 390,338

18 Claims. (Cl. 343—9)

This invention relates to a Doppler-inertial system for the measurement of speed, drift, and vertical direction. Although such systems are ordinarily termed Doppler-inertial systems, this invention relates more broadly to a system employing either Doppler or any other means for measuring speed and drift, combined with the employment of inertial means for measurement of accelerations.

The problem which this invention solves relates to the motion of a vehicle upon or along the surface of the earth, the vehicle being earth-borne, or moving in water or air, but the invention is particularly applicable, because of the refinement of its method and the precision of its results, to air-borne vehicles. The data for this problem consist of motional data secured by means of instruments within or on the vehicle, without any connection with outside objects by material means, and without observation of landmarks or any other selected and known objects outside of the vehicle.

In the solution of this problem, this invention makes use of electromagnetic or acoustic and gravitational field effects to secure precise instantaneous values of the velocity of the vehicle relative to the earth along the vehicle's ground track thereon, the drift angle, and roll and pitch angles. The roll and pitch angle sensing together constitute the sensing of the vertical direction or, more accurately in the case of a moving vehicle, with appropriate corrections, sensing of the plumb line or static vertical. These output values may be applied in many ways, such as in dead reckoning and observational navigation, and in bombing.

One well-known class of navigation systems employed on vehicles makes use of the Doppler principle. By radiating electromagnetic energy from a moving vehicle and measuring the frequency of a portion thereof reflected from the surface of the earth such systems indicate the ground speed and drift of the vehicle, and these outputs can be employed, for example, in dead reckoning navigation. Because of the generally varying nature of the surface reflecting the radiant energy, and for other reasons, the received echo energy varies widely in frequency from instant to instant. Its averaged value, however, can be made highly accurate, and in fact if there are no other requirements than average accuracy, and if the averaging be done over sufficiently long periods, there is in theory no limit to the accuracy obtainable. Highly refined integrating means for averaging the input have therefore been developed and are well known in their applications in such systems. The instantaneous accuracy is poor however, because the input data contains statistical fluctuations.

Systems of this type are described in patent applications Serial No. 749,184, now Patent No. 2,869,118, entitled Navigation System, filed May 20, 1947, of William J. Tull et al.; Serial No. 49,926, now Patent No. 2,869,-117, entitled Course and Speed Indicating System, filed September 18, 1948, of France B. Berger et al.; and Serial No. 249,472, entitled Course and Speed Indicating System, filed October 3, 1951, of France B. Berger et al.

Another class of systems for similar uses employs the property of inertia. By means of this property as, for example, manifest in operation of an accelerometer, any change in the straight line speed of a vehicle may be measured, and also any deviation of the movement from a straight line may be measured, both with great accuracy. These data may be employed for navigation, bombing and other purposes in conjunction with other data regarding the condition of the vehicle at the instant of starting observations. For example, if at an initial instant the speed be known and if thereafter accelerometer data on speed change be secured, the instantaneous speed can be found. Such inertial systems are subject to error due to gyroscopic drift, forcing errors, etc., and therefore the accuracy of their output decreases as a function of time.

Another way of looking at the capabilities of Doppler and inertial systems is in terms of the frequency of changes in input data. Doppler systems may be said to be inherently highly accurate in following the low frequency components of input data but not the high frequency components, while the reverse is true of inertial systems, which follow high frequency or derivative components of input velocity and drift data, but which are worthless by themselves for following low frequency components and are inherently incapable of sensing steady state values at all. Moreover, comparing the two types, both are inaccurate at the crossover region between high and low frequencies, so that even if the two separate systems be used simultaneously, their outputs would have the common defect of poor accuracy in the crossover region.

It has been discovered, however, that if two systems of the Doppler and inertial types are united in a single integrated system, it is possible to secure speed, drift, roll, and pitch data of great instantaneous accuracy and at all input frequencies, and this instantaneous accuracy is maintained indefinitely. Such a system is therefore better than either of its mentioned component systems can possibly be as regards their quality of the stated output data. In addition, such a compound system provides all four kinds of data with accuracy, whereas neither system alone is capable of such results.

That is, systems employing Doppler methods provide long-time accurate averages of ground speed and drift data; inertial systems provide initially accurate instantaneous values of ground speed change and drift change data; and the compound system of the invention including both types of systems as prime components provides not only these values but also continuously accurate instantaneous values of ground speed change and drift change, and in addition provides continuously accurate instantaneous values of ground speed and drift, maintaining their accuracy for an indefinitely extended time. In addition, the integration of both systems into a single compound system permits the erection and maintenance of a stable static vertical reference, from which may be secured a continuously highly accurate indication of the vertical direction, which is in general not furnished by either component system alone.

In employing both types of system as constituents of a single compound system for use in a vehicle, the motion of the vehicle comprises input data for both systems, and since power is added at various points in the system, one or more closed data loops are formed. Such a compound system therefore has characteristics of servo system loops. As is well understood, such loops depend for their effectiveness in the development of output data upon the control of their oscillatory characteristics or time constants and upon damping control.

It has been discovered that in the compounding of a Doppler and inertial system in accordance with this invention such a servo condition is set up, and that both the time constant and the damping constant can be controlled. It furthermore has been discovered that there is an optimum damping value at which it is possible to select such optimum time constant as to minimize, at one and the same time, both the errors arising from statistical noise in the Doppler measurement and the errors arising from gyro drift or other causes in the inertial system.

The instrumentation of this invention includes a system to produce values of speed along the ground track of the vehicle and values of drift angle between the ground track and the vehicular axis. Such systems will before integration produce instantaneous values of speed and drift inherently containing wide statistical fluctuations. If, for example, the system employs microwave Doppler measurement of speed and drift, the Doppler return frequency consists of a wide spectrum of frequencies and not a single frequency. Because of the nature of the reflection of microwave energy the median spectrum frequency, which is taken as the true Doppler difference frequency, is continuously changing, so that the output speed and drift data also continuously change. The instrumentation also includes an acceleration measuring inertial system carried on a support or platform which in turn is suspended within the vehicle so as to have three degrees of limited freedom as, for example, by a Cardan suspension combined with a vertically rotatable shaft. The support is made and maintained level by torquing motors attached to its bearings. The support carries gyroscopes which are sensitive to rate of change of position of the platform. These gyroscopes transmit their data to the torquing motors. Since, however, all gyroscopes have uncertainty of output increasing with time due to drift, such an inertial system by itself cannot maintain the platform level.

The instrumentation therefore also includes appropriate interconnections between the speed and drift measuring and inertial systems by which the ability of the former system to sense track speed and drift is combined with the ability of the inertial system to sense both horizontal accelerations and deviations of the platform from the horizontal, although not discriminating between them, to result in the compound instrument in a continuous coercion of the platform to true horizontality. The result is to correct continuously the instantaneous values of speed, drift, roll and pitch so that they become of high and continuing accuracy.

The speed measuring system may include within itself a heading reference, so that in addition to the foregoing output data, orientations of the ground track and of the vehicle's axis relative to the direction of the North Pole of the earth or other reference direction can be computed by automatic or other means. Also, if an initial position or other position be furnished, present latitude and longitude data can be automatically or otherwise computed. On the other hand these are not necessarily functions of the speed measuring system but may be effected in separate components more conveniently associated with other parts of the instant apparatus.

In order to extend the usefulness of this invention, the instrumentation includes devices to neutralize the effect of earth rotation and of Coriolis accelerations.

The general purpose of this invention then is to combine elements of Doppler and inertial systems into a compound interwoven system having such interconnections as to minimize Doppler noise and inertial component errors such as gyro drift effects, thereby producing a true indication of the direction of the vertical which is completely unaffected by acceleration effects, while in addition producing instantaneous output data, including velocity along the ground track and drift, which are accurate at all frequencies of input data, including crossover frequencies.

A further purpose of this invention is to provide such a compound system in which there is a negatively fed back energy loop having the qualities of periodicity and damping, and in which the values of the parameters controlling these qualities are preselected to minimize output data error.

Another purpose is to combine elements of a speed and drift measuring system with elements of an inertial system for measuring accelerations to produce and maintain an indication of the static vertical and indications of the instantaneous speed and drift.

Still another purpose is to provide an inertial Doppler navigation system of high accuracy employing relatively low accuracy gyroscopes.

A further understanding of this invention may be secured from the detailed description and associated drawings, in which:

Figure 1 schematically indicates the interrelations of the component parts of the instrument of this invention.

Figure 2 indicates the interrelations of the several horizontal angles referred to in this description.

Figure 3 is a schematic and isometric representation of the wiring of the instrument of this invention.

Figure 5 is a schematic diagram of a circuit for providing correction for the earth's sidereal rate and Coriolis acceleration.

The vehicle carrying the instrument of this invention may be of any type as was stated, but the nature of this invention makes it peculiarly useful on an aircraft which requires a self-contained system of minimum weight and maximum accuracy. For that reason this system is described as installed in an aircraft.

Figure 2:
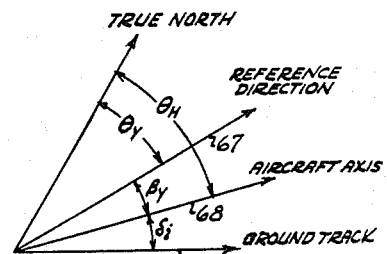
Figure 1:
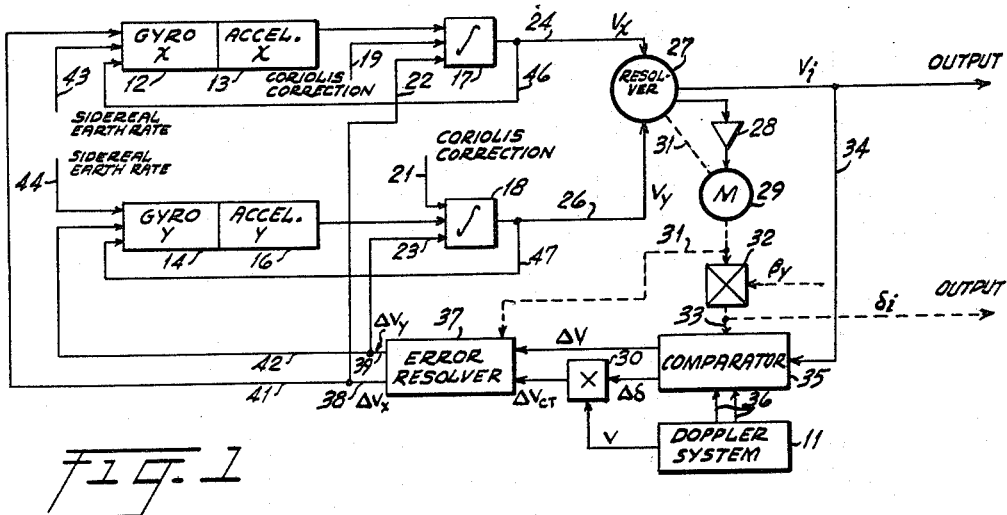

The speed and drift measuring system chosen for detailed description is of the type employing the measurement of microwave Doppler frequency differences. Such a Doppler system is indicated in Fig. 1 by the rectangle 11. The inertial system for acceleration measurements includes a combination of a gyroscope 12 and accelerometer 13 sensitive to changes in the X-axis direction, and a similar combination 14 and 16 for the Y-axis direction. Both of these gyroscope-accelerometer pairs are mounted on a single platform maintained pointing in the direction of the Y-axis. The outputs of these gyroscope-accelerometer combinations are integrated in integrators 17 and 18, where the Coriolis corrections are also applied as indicated by arrows 19 and 21, and damping terms are applied as indicated by arrows 22 and 23. The outputs 24 and 26, being integrated accelerations, represent aircraft velocities $V_x$ and $V_y$ in the X- and Y-axis directions. These quantities are applied to a resolver 27 which adds them vectorially to produce a magnitude, $V_i$, representing their vector sum. The resolver in combination with amplifier 28 and motor 29 positions its own shaft 31 to the angle betwen the vectors representing input $V_y$ and output $V_i$. This angle is also the angle between the platform axis direction Y and the ground track direction. This angle is applied by the shaft 31 to a differential 32, where the angle $\beta_y$ between the reference axis Y and the aircraft heading is subtracted. The difference, $\delta_i$, is the angle between aircraft heading and ground track and is the angular displacement of shaft 33. These angular relations are indicated in Fig. 2.

The output quantities $V_i$ and $\delta_i$ are aircraft speed and drift as sensed by the inertial system. They have good short term accuracy but are subject to inaccuracy growing with time. In order to maintain accuracy these quantities are applied through shaft 33 and conductor 34 to a comparator 35, where they are compared with and subtracted from similar quantities generated within the Doppler system 11 and applied through conductors 36. The differences constitute velocity and drift error signals $\Delta V$ and $\Delta \delta$. The latter is multiplied in multiplier 30 by ground track speed to convert it into cross track velocity error, $\Delta V_{ct}$, and both are coordinate-shifted in a resolver 37 to secure error signals in the X- and Y-axis directions at conductors 38 and 39. These error signals are applied through conductors 41 and 42 to the platform to bring it to horizontality if initially not so, and to maintain it level. This action also corrects $V_x$ and $V_y$. The error signals are also applied through conductors 22 and 23 to the integrators 17 and 18 to damp the loops in proportion to the error signal magnitudes.

Signals representing sidereal earth rate are applied electrically to gyroscopes 12 and 14 as indicated by arrows 43 and 44. These neutralize the effect of the rotation of the earth.

The feedback lines 46 and 47 represent inertial loop closures, and are necessary because the earth surface is curved. Without these loop closures, navigation by inertial means alone in the absence of the Doppler system would be along a straight line in inertial space, but since the loops are closed, navigation by inertial means alone follows the curvature of the earth.

The motion of the aircraft and the acceleration of gravity comprise inputs to the system of this invention. In order to sense these inputs, the accelerometer and gyroscopes are mounted on a suspended platform as shown in Fig. 3. A horizontal gimbal ring 48 is suspended by two bearings 49 and 51 from the frame of the aircraft, with these bearings parallel to the roll or longitudinal axis of the aircraft. A second gimbal ring 52 is suspended in a vertical plane from cross bearings 53 and 54 carried by ring 48. A vertical shaft 56 is journalled in the vertical ring 52, with the bottom bearing shown, the upper part of the shaft and parts of the rings being broken away for clarity. The vertical shaft 56 carries a platform 57 which can be held in the horizontal plane by torquing motors or rotary solenoids 58 and 59 at the gimbal ring bearings. The platform 57 supports accelerometers 61 and 62, and gyroscopes 63 and 64. These gyroscopes sense level changes. A third gyroscope 66 senses changes in orientation of the platform in the horizontal plane.

The direction of the longer dimension of the platform 57 is termed the Y-axis, and the direction of width the X-axis. The platform's Y-axis is held, by means to be described, in a direction 67 termed the reference direction. This direction is referred to inertial space, which is to say that it is fixed in relation to the fixed stars except that it is continuously corrected so as to be maintained parallel to the earth's surface. As an example in the special case of operation at the equator with the reference directional along a meridian, this direction would remain fixed in inertial space during the sidereal rotation of the earth, and the Y-axis of the platform would remain pointing without correction to the same point in the celestial sphere. This is also true at the poles. At any other location the requirement for parallelism of the Y-axis with the earth's surface will cause the point of reference in the celestial sphere to change continuously. With reference to the aircraft course, if it is a great circle course, the reference direction 67 will either maintain a fixed angular relation or will vary or rotate continuously, depending on whether a correction representing the earth's sidereal rotation rate is applied or is not applied. In the instrumentation to be described such a correction is applied. The angle between the reference direction 67 and the aircraft axis direction 68 is termed $\beta_y$, as mentioned before, and as indicated in Fig. 2.

The gyroscopes 63, 64 and 66 are indicated by cylinders representing their control structure having the output torque axis along the axis of the cylinder and having the spin axis marked by an arrow. These gyroscopes may be either of the rate type, sensing rate of change of position, or of the integrating rate type which give outputs proportional to the integral of the rate of change of position. The latter type is preferable because it simplifies the application circuit. Gyroscope 63 is sensitive to changes in level of platform 57 in the direction of its Y-axis, and its sensitive torque axis 63' is therefore in the X-axis direction. Gyroscope 64 is similarly sensitive to changes in the X-axis direction only, and its sensitive axis 64' is indicated. The zero positions of gyroscopes 63 and 64 are controlled by precessing signals. One signal is applied through conductor 65 to gyroscope 64 and the other is applied through conductor 70 to gyroscope 63. The take-offs of these gyroscopes may be of any conventional type. Each take-off may consist, for example, of a solenoid having several primary and secondary windings and a core so positioned normally that no output alternating voltage is produced across the secondary terminals. The core is viscously coupled to the rate gyroscope axis of rotation, so that deflection of the core is proportional to the integral of the rate of canting of the platform. This core deflection produces a proportional output voltage across the secondary terminals and their conductors, the take-off conductors of gyroscopes 63 and 64 being indicated at 69 and 71.

The gyroscopic take-off voltages are made to operate the roll and pitch torquers 58 and 59 through a suitable resolver and amplifiers, a resolver being indicated at 72 and amplifiers at 73 and 74, from which conductors 76 and 77 impress power on the torquers 58 and 59. It is obvious that if the reference direction 67 should coincide with the aircraft roll axis direction 68 all aircraft rolling or equivalent changes in the platform level would be sensed by gyroscope 64 and the voltage output thereof could be amplified and applied exclusively to the torquer 58. Similarly, if a 90° angle should exist between the reference direction 67 and the aircraft axial direction 68 the gyroscope 63 output voltage would alone be applied to torquer 58. However, since in general neither condition will exist, the outputs of both gyroscopes must be jointly applied to a resolver which is positioned in accordance with the angle $\beta_y$ so that effectively it transforms axes and applies to each torquer an appropriate signal which contains those parts of roll level change sensed by each of the gyroscopes.

Nearly all of the components used as examples in this embodiment have numbers of equivalents which may be substituted, depending upon the type of power supply or of signal, or depending upon convenience. For example, the resolver 72 may be of the double sine potentiometer type if the input signals are direct current, or may be a synchro resolver as shown using alternating input signals. The synchro resolver 72 comprises a composite field set up by two primary windings 78 and 79 energized by in-phase alternating current signals from the gyroscopes 63 and 64. Two secondary windings 81 and 82 are bodily rotated to shift the effect of the composite field upon them. Rotation is proportional to angle $\beta_y$, which is applied to the resolver through a shaft 83 positioned by a position servomechanism 84, which in turn is electrically actuated by a signal applied through conductor 86 from an azimuth takeoff 87. This take-off may be of any type generating an electrical signal proportional to the angle $\beta_y$ and which does not impede the movement of the shaft 56.

The gyroscopes 63 and 64 are restored to their normal attitudes representing their zero precession positions and determining the level of platform 57 by precessing forces which are applied in accordance with output error signals of the entire measuring system. Since these signals are generated in accordance with a system employing the horizontal ground track direction 88 and horizontal cross track direction perpendicular to arrow 88 as reference coordinates, these signals must be resolved to the reference direction and cross reference direction by means of a second resolver 89. This resolver is similar to the resolver 72 and is positioned through shaft 91 by a signal representing the indicated ground track angle relative to the reference direction and termed $\beta_y + \delta_i$. The output voltages, $\Delta V_x$ and $\Delta V_y$, are amplified by amplifiers 92 and 93 and are applied through conductors 94 and 96, algebraic adding devices 97 and 98 and conductors 65 and 70 to coercing devices within gyroscopes 64 and 63 respectively, by which couples are applied to these gyroscopes to induce precession, various specific means for this purpose being well known in the art.

The algebraic adding devices 97 and 98 are for the purpose of adding electrical signal magnitudes and may consist of adding resistors. However any of a number of other types of adding devices may be used alternatively in these locations and elsewhere in the apparatus of the invention. When mechanical adding devices are indicated in Figs. 3 and 5 gear differentials are to be understood. However, here also any other suitable mecahnical adding device may be employed. The multiplying, integrating and resolving devices indicated in Figs. 1, 3, and 5 likewise may alternatively be of other types than those described. Moreover mechanical methods and components of these schematic diagrams may obviously be replaced by electrical methods and components and vice versa without affecting the general validity of the diagrams.

The function of the two integrating rate gyroscopes 63 and 64 is briefly, to sense changes in levelness of the platform and to restore levelness by torquing the gimbal bearings. The sensing levels of the gyroscopes are controlled by output error signals generated in a manner to be described later. This signal control is necessary to introduce a zero reference in to the gyroscopes and to compensate for gyroscopic drift that would be induced by the sidereal rotation of the earth as well as for the frictional drift inherent in all free gyroscopes.

Changes in the orientation of the level platform 57, constituting digressions of the platform's lengthwise axis from the reference direction 67, are sensed by the third integrating rate gyroscope 66, which is termed the azimuth gyroscope. This gyroscope may be placed anywhere on the platform with its axis of rotation parallel thereto but in order to neutralize the small amounts of angular momentum possessed by itself and the levelling gyroscopes, it is placed with its spin axis in the plane of their spin axes and at 45° to each of them. Its angular momentum is made to have an opposing value 1.41 times that of each of the levelling gyroscopes. The platform 57 is therefore non-gyroscopic in the sense that it is not maintained level by the stiffness in space of massive gyroscopes. The azimuth gyroscope 66 is connected to be precessed by its own output amplified by amplifier 104 but is not controlled externally. Its drift therefore is included in its output signal at conductor 106. This signal is amplified by amplifier 107 and operates the azimuth torquer 108 to maintain the platform's Y-axis oriented to the reference direction 67. The direction of platform orientation slowly drifts because of the gyroscope error, but the error in the electrical output from the take-off 87 through conductor 86 is corrected elsewhere by comparison with a magnetic or astro compass so that, except during periods when the magnetic compass is ineffective, the error gyroscope 66 does not produce any error in the outputs of the system.

The inclusion of the azimuth of gyroscope 66 in this part of the system is not essential to its operation, for an azimuth sensing device may be located in the Doppler portion of the system.

In this method of holding the platform level, the values of the gyroscopic angular momentums are small and are made to cancel each other, so that their effects are incidental and do not control the platform directly. In is possible, however, to stabilize the platform directly by gyroscopes, as is well understood, in which case gyroscopes comprising ponderous rotating masses would be employed, instead of the platform being torqued the gyroscopes themselves would be torqued or precessed, when the angular momentum of each would be exerted in a direction at right angles to the precessing force to erect the platform. This method of operation is ordinarily confined to control in the azimuthal plane and the azimuth gyroscope is then much larger than the other two.

Changes in speed in the reference direction and transverse thereto are sensed by the two accelerometers 62 and 61 respectively, orthogonally mounted on platform 57. More explicitly, the accelerometer 62 senses accelerations of speed in the straight line along the reference or Y-axis direction, and accelerometer 61 senses accelerations caused by changes in direction of the ground track relative to the reference direction.

If measurement of vertical velocity is required a vertical accelerometer may be mounted on platform 57, or a simple type of rate of climb meter may be mounted elsewhere, as is mentioned in connection with the Coriolis correction component to be described later.

Figure 4:
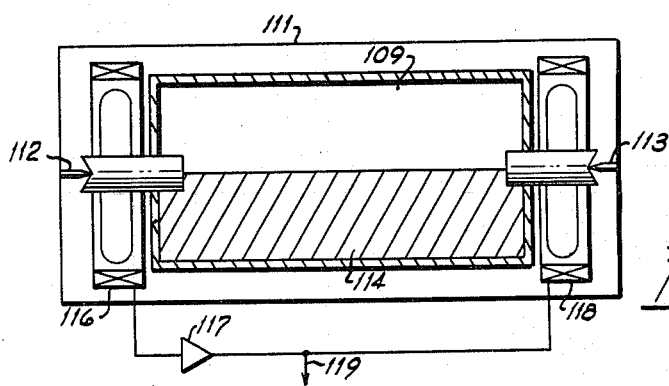
Figure 4 is a schematic representation of an accelerometer suitable for use in connection with this invention.

Fig. 4 represents one form of accelerometer suitable for use in this invention because it is highly sensitive to horizontal acceleration and relatively unaffected by vertical acceleration. A cylinder 109 is supported in a case 111 by means of pivot bearings 112 and 113. The cylinder 109 is weighted at 114 so that it is pendulous. The space in the case 111 surrounding the cylinder is filled with liquid and the cylinder is adjusted in weight so that it exactly floats in the liquid, eliminating any bearing friction due to weight. An angle-sensing device 116 applies an input signal to an amplifier 117 proportional to the departure of the pendulous mass from its bottom position. The amplifier output current controls a torquing device 118 which applies a torque to the cylinder substantially equal and opposite to the acceleration torque, thus holding the mass 114 very nearly in its bottom position at all times. The amplifier output current indicated at 119 is proportional to the acceleration torque and proportional to the tangent of the angle which a free pendulum would assume under the forces of gravity and of the horizontal acceleration.

The sensing device 116 and torquing device 118 may be similar and each may consist of a four-pole stator energized with alternating current to form a bipolar field, with a soft iron armature at the neutral point. A secondary winding in the sensing device 116 is arranged to sense any departure of the armature from its position. In the torquing device 118 current through the secondary winding distorts the magnetic field to apply torque to the armature.

The electrical output of the accelerometer 62, Fig. 3, is represented by an electrical signal in the group of output conductors schematically represented by line 121. This signal represents by its magnitude the magnitude of the very small deflection angle of accelerometer 62, and is proportional to accelerations in the sensitive direction of the accelerometer.

The electrical signal in conductors 121 is algebraically added in device 122 to a Coriolis correction and in device 123 to a damped feedback correction, the devices 122 and 123 being similar to described device 97. These corrections respectively correct for the error in indicated vertical due to aircraft speed around the rotating earth and for errors attributable to accelerometer and gyroscopic instrument errors and to Doppler system noise errors. In addition, the correction added at device 123 effectively applies scale and integration constants to the signal.

Following the algebraic adding device 123 the signal is applied to an amplifier 124 where it is amplified a number of times representing multiplication of the angle by the square of the earth constant, $W_E^2$ defined as equal to the acceleration of gravity $g$ divided by the earth's radius R. The resulting signal is integrated in an integrator, generally depicted by the block 126, which may be any conventional type of integrator as, for example, a device of the motor-tachometer type. The output at conductor 127 carries a signal representing instrument speed in the Y-axis direction in angular terms, that is, in speed of change of the angle subtended at the center of the earth representing the reference direction component of the position of the aircraft, and termed $V_y$.

Similar apparatus is connected to accelerometer 61, the output conductor 128 of which is connected through a Coriolis correction adding device 129, a damping term adding device 131 and an amplifier 132 to an integrator 133. The output signal at conductor 134 represents aircraft velocity in the X-axis direction and is termed $V_x$.

The foregoing system for measuring change of linear horizontal ground speed, when augmented by the addition of corrections and including an integrator as described, is capable of producing an indication of linear horizontal ground speed and of cross track speed and is termed the inertial system. In addition, this system produces an indication of the true vertical direction as represented by the levelness of platform 57 which in practice is sensed by securing components of roll and pitch data from gimbal bearing takeoff devices 125 and 130, these component outputs being schematically indicated by data output lines 135 and 136. However, as before mentioned, all output data of an inertial system alone contain errors which rapidly become very large. In the instant system these errors are continuously corrected at devices 122, 123, 129 and 131 because of interconnections through them to a second and completely independent system indicated at 137 and termed the Doppler system.

The Doppler system 137 may be of any known design such as one of the designs previously referred to. It employs a radiated electromagnetic field and by use of the Doppler principle produces output data representing the linear horizontal ground speed of the vehicle $V_D$ and the drift angle $\delta_D$. In order to relate the ground track velocity measured by the Doppler system to a geographical reference, the system must in addition contain a heading reference or be provided from an external source with heading reference data. If in addition the Doppler system be provided with initial or subsequent ground position fix data and if it be associated with a computer, it can be made to give continuous outputs representing present position, in terms if desired of latitude and longitude.

The Doppler speed, $V_D$, is represented by an electrical output data signal in conductors 138. This signal is applied to an algebraic adding device 139 to which the inertial system speed datum $V_i$ is also applied through conductor 140. The difference, $\Delta V$, in conductor 141 represents the instantaneous difference between the measurements of speed by the two systems which are now interdependent. This error signal $\Delta V$ is fed back to the inertial system through its gyroscopes to control their zero level points and to control the period of the feedback loop thus formed. Since the error signal is orthogonal to the ground track its coordinates must be shifted to the X- and Y-axis coordinate system before application to the gyroscopes. This is done in the coordinate-shifting synchro resolver 89. The $\Delta V$ signal is applied through conductor 141 to a primary winding 142 of resolver 89, which is positioned through shaft 91 to angle $(\beta_y + \delta_i)$. A second error input representing cross track velocity error $\Delta V_{CT}$ is applied to a second primary winding 143, so that outputs from the secondary windings 144 and 146 represent the errors $\Delta V_x$ and $\Delta V_y$ in the X and Y axial directions respectively. The error signal $\Delta V_x$ is applied through conductor 147, amplifier 92, conductor 94, control potentiometer 148, adding device 97 and conductor 65 to the axis of gyroscope 64, and the orthogonal error signal $\Delta V_y$ is similarly applied through conductor 149, amplifier 93, conductor 96, control potentiometer 151, adding device 98 and conductor 70 to the axis of gyroscope 63.

The error signals $\Delta V_x$ and $\Delta V_y$ are also applied to effect damping and other functions, as mentioned. Signal $\Delta V_x$ is applied through conductor 147, amplifier 92, conductor 152, adding device 131 and amplifier 132 to integrator 133. Signal $\Delta V_y$ is applied through conductor 149, amplifier 93, conductor 153, adding device 123, and amplifier 124 to integrator 126.

The amounts of the damping applied to integrators 126 and 133 are less than critical, as is inferred by the existence of a system periodicity, and the amount of the damping, when optimum, permits an optimum adjustment of the period controls 148 and 151. At this optimum adjustment of period the sum of the errors due to gyro randon drift and the errors due to Doppler noise is minimized.

The reference axis aircraft velocity signals $V_x$ and $V_y$ are coordinate-transformed to furnish ground speed and drift outputs in the following manner. The X-axis velocity signal $V_x$ is applied from conductor 134 through an amplifier 154 to one primary winding 156 of a synchro 157. The Y-axis velocity signal $V_y$ is applied from conductor 127 through an amplifier 158 to a second primary winding 159.

The synchro 157 has two secondary windings one of which, 161, is connected to a servo comprising amplifier 162 and motor 163 in such sense that the synchro shaft 91 is servoed to the angle at which the potential induced in winding 161 becomes zero. The potential induced in the orthogonal secondary winding 164 then is maximum and represents the orthogonal vector sum of the primary quantities while the shaft position represents the angle between the vector sum and one of the primary components. That is, the output in conductor 140 represents the ground track speed as inertially measured, $V_i$, and the shaft angle represents the angle, $\beta_y + \delta_i$, between the ground track and the reference direction.

The shaft angle $(\beta_y + \delta_i)$ is applied to an algebraic adding device 166 to which is also applied the shaft angle $\beta_y$ from the azimuth take-off device 87 through servo 84 and conductor 167. The difference, $\delta_i$, is the drift angle output of the system.

In order to complete the system loops it is necessary to subtract speed and drift as indicated by the inertial and Doppler systems to secure speed and drift error signals, which are then fed back to control the inertial system.

In order to secure the drift error signal the inertial system drift output signal, $\delta_i$, represented by the angular deflection of shaft 168, is applied through a potentiometer 169, converting the shaft deflection to an electrical signal, to a subtracting device 171. To this device is also applied $\delta_D$, the drift angle as measured by the Doppler system 137, so that the difference, $\Delta\delta$, is an error signal representing the difference between the drift measurements of the Doppler and inertial systems. This quantity is applied through conductor 172 to a multiplying device 173, where it is multiplied by the ground speed $V_D$ secured through conductor 138 from the Doppler system 137. The output is cross-track velocity $\Delta V_{CT}$. It is applied through conductor 176 to the primary coil 143 of resolver 89 to help form the error signals $\Delta V_x$ and $\Delta V_y$ as before described.

The multiplying device 173 may, for example, comprise a pentode having the input signals applied to its first and third grids and having a plate current representative of their product.

The algebraic subtracting devices 139 and 171 perform similar duties, one in the compound speed-measuring system and the other in the compound drift-measuring system. These devices have been described as external to the Doppler system 137. However, in some cases it may be preferred to incorporate these devices as parts of the Doppler system, when the outputs of the Doppler system will include the speed error signal $\Delta V$ and the drift error signal $\Delta\delta$ in place of the actual speed and drift signals $V_D$ and $\delta_D$.

Correction for the rate of rotation of the earth is necessary in operating any free gyroscope as a horizontal direction reference device, and correction for Coriolis acceleration is necessary for high accuracy. More specifically, the insertion of the Coriolis correction results, in observing the vertical direction from a fast-moving vehicle, in data representing the plumb line or static vertical, which is the requisite vertical for astronomical observations and for use in certain bombing computations. When the Coriolis correction is not applied it is the dynamic vertical which is sensed by the compound system of this invention, the difference between the two types of vertical varying in direction and amount with course and speed.

These earth sidereal rate corrections and Coriolis corrections are generated by a correction circuit 177 provided with input connections 178, 179 and 167 for the introduction thereto of reference axis velocities $V_x$ and $V_y$, and heading angle $\beta_y$ relative to the reference direction. As stated, an input 181 representing present latitude can be secured from any source either within the Doppler system or associated therewith, and represented by the rectangle 180. In addition, magnetic variation is inserted through conductor 182. It may be applied either by a manual adjustment 183 or by connection to an automatic generating device of conventional design, preferably within the Doppler system as all required data can be made available there. A signal representing vertical velocity of the vehicle, $V_z$, is generated by a generator 184 and is applied to the correction circuit 177 through a conductor 186. The output signals carried by conductors 187 and 188 represent orthogonal components of the earth sidereal rate coordinate-shifted by the angle $\theta_y$, Fig. 2, which is the angle between true North and the reference or platform Y-axis direction 67 in the horizontal plane. These signal components are termed $W_x$ and $W_y$. These components are added at the adding devices 98 and 97 to the outputs of the gyroscope leveling resolver 89. The angular deflection of output shaft 189 represents true heading $\theta_H$ and is secured from magnetic compass heading plus variation in combination with the inertial heading. These data are so combined as to keep the inertial heading in agreement with the compass heading when the latter is available, and to provide a heading reference during times when compass heading is not available.

The Coriolis correction signals are transmitted through conductors 191 and 192 to adding devices 129 and 122, where they are added to the outputs of the accelerometers 61 and 62.

The Coriolis acceleration is a vector represented by minus two times the cross product of the vectors $W_R$ and $V_g$, or $-2W_R \times V_g$, in which $V_g$ is the linear velocity of the vehicle along its ground track relative to the earth and $W_R$ is the earth's sidereal rate of rotation. The correction to be applied has the opposite sign, and is $+2W_R \times V_g$. Since one term represents angular velocity and the other linear velocity, the product has the dimensions of acceleration. The terms $W_R$ and $V_g$ are both vectors, and their cross product is resolved to X, Y, and Z axes, the Z axis being defined as perpendicular to the earth at the position of the aircraft. Since the acceleration correction is desired in the horizontal plane only, the term for acceleration along the vertical axis is neglected. The vertical component of aircraft velocity is small and may be neglected. However, if retained the relation is:

$$2W_R \times V_g = 2(W_y V_z - W_z V_y)i + 2(W_z V_x - W_x V_z)j \quad (1)$$

In this equation $W_x$, $W_y$ and $W$ are the resolved components of $W_R$ and $V_x$, $V_y$ and $V_z$ are the resolved components of $V_g$. The symbols $i$ and $j$ represent unit vectors along the X- and Y-axes. The scalar part of this equation is to be instrumented to generate the Coriolis corrections.

Figure 6:
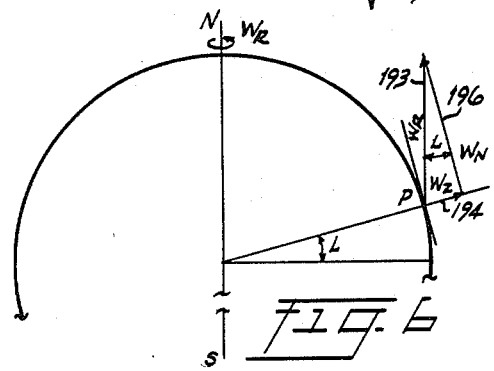
Figure 6 illustrates the resolution of the earth's sidereal rate into two components.

The sidereal earth rate corrections $W_x$ and $W_y$ are derived as follows. In Fig. 6 the circle represents the earth with axis N—S. Its angular velocity about its axis is represented by the vector 193 paralleling the earth's axis and located at the position P of the aircraft. The vertical component of $W_R$ is then the vector $W_z$ 194, having the value $W_R \sin L$, in which L is the latitude of P, or $$W_z = W_R \sin L \quad (2)$$

The north-south component is the vector 196 termed $W_N$ having the value $$W_N = W_R \cos L \quad (3)$$

Since the angle between the north direction and the reference or Y-axis direction is $\theta_y$, the component in the Y-axis direction is $$W_y = W_N \cos \theta_y = W_R \cos L \cos \theta_y \quad (4)$$

and the X-axis component is $$W_x = W_N \sin \theta_y = W_R \cos L \sin \theta_y \quad (5)$$

These are the equations which must be instrumented to insert sidereal earth rate into the instrument.

The correction circuit 177, Fig. 3, for generating the sidereal earth rate signals and the Coriolis acceleration correction signals is schematically indicated in Fig. 5. A generator 197 generates an electrical signal representing $W_R$, which is applied to a resolver 198. The latitude of aircraft present position represented by the angular deflection of shaft 181 is employed to position resolver 198, so that the outputs are electrical signals in conductors 199 and 201 representing $W_N$ and $W_z$ respectively.

A magnetic compass 202, preferably of the flux type, is associated with a control transformer 203, motor 204 and amplifier 206 to produce an output magnetic heading angle $\theta_M$ represented by the angular deflection of shaft 207. Magnetic variation represented by the deflection of shaft 182 is set in at an adding device 208 to procure the true heading angle $\theta_H$. This angle constitutes a useful output at shaft 189. It is also subtracted in device 209 from the reference heading represented by the deflection of shaft 167 to form the angle $\theta_y$ representing the angle between true north and the reference direction of the Y-axis. This angle $\theta_y$ is applied as a deflection of shaft 211 to a resolver 212 which is energized from conductor 199 by the signal representing $W_N$, resulting in its components $W_x$ and $W_y$, represented by electrical signals in conductors 187 and 188 respectively. These components are applied as indicated and described in connection with Fig. 3 to introduce the sidereal rate of rotation of the earth. The Coriolis correction signals are generated by applying the signal $W_z$ through conductor 201 to a servomechanism 213 by which the signal is converted into the equivalent deflection of a shaft 214. The signal is then multiplied by two by a 2:1 gear 215 to form a signal in shaft 216 representing $2W_z$. The electrical signal in conductor 179, Figs. 3 and 5, representing $V_y$ is applied to a converter 217 changing its sign from positive to negative. This converter may consist, for example, of a potentiometer, motor, amplifier and subtracting circuit combined to form a servomechanism with electrical output. The output is applied through conductor 218 to a voltage divider multiplier 219 having a slider 221 moved by shaft 216. The slider output at conductor 222 then represents $-2W_z V_y$.

It is to be understood that although the gear 215 mechanically multiplies the shaft angular deflection by two, this multiplication may be effected in any one of a number of well-understood ways, such as by changing the constants of the servomechanism 213.

The vertical aircraft rate may be secured from a rate-of-climb meter or otherwise and made to appear as a deflection of shaft 186. It is multiplied by two in gear 223 to form the term $2V_z$ as the deflection of shaft 220. This deflection is applied to the slider 224 of a voltage divider multiplier 226 which is energized by connection to conductor 188 representing $W_y$, the slider conductor 227 therefore carrying the signal $2W_yV_z$. Conductors 222 and 227 are connected to an adding circuit 228 to form an output signal in conductor 191 representing $2W_yV_z-2W_zV_y$. This is the first term on the right side of Equation 1 and therefore is the X-axis correction term. It is introduced as explained in connection with Fig. 3 through device 129 to the output of the X-axis accelerometer 61 before application to its integrator 133.

The other Coriolis correction term is generated by connecting the shaft 216, Fig. 5, to position the slider 229 of a voltage divider 231 which is excited through conductor 178, Figs. 3 and 5, in accordance with the signal $V_x$. The output in conductor 232 then represents $2W_zV_x$. The slider 223 of a voltage divider 234 is positioned by shaft 220 and the voltage divider 234 is energized from the $W_x$ component conductor 187 through the sign-changing converter 236 and conductor 237. The output in conductor 238 then represents $-2W_xV_z$. The conductors 232 and 238 are connected to an adding circuit 239 where their signals are added to form in output conductor 192 the signal representing $$2W_zV_x-2W_xV_z.$$

This is the second term on the right of Equation 1 and therefore is the Y-axis correction term. It is introduced as explained in connection with Fig. 3 through device 122 to the output of the Y-axis accelerometer 62 before application of the accelerometer signal to its integrator 126.

In the foregoing detailed description the accelerometers 61 and 62, Fig. 3, are mounted on the platform 57 with the three gyroscopes. However, alternatively the accelerometers may be mounted on a rotating platform which is mounted in turn on the platform 57, and the rotating platform may be kept oriented to the ground track. The correction data to the gyroscopes is then inserted in the accelerometer outputs in such manner as to include the angle between the reference direction and the ground track.

If it is desired to neglect the aircraft vertical velocity term $V_z$, the input datum on shaft 186, Fig. 5, is set at zero, so that the values of $2W_yV_z$ and of $-2W_xV_z$ become zero and Equation 1 becomes $$2W_R\times V_g=-2W_zV_y+2W_zV_x \qquad (6)$$

The $x$ and $y$ Coriolis corrections then are $-2W_zV_y$ and $2W_zV_x$ on conductors 191 and 192 respectively, and the Coriolis correction portion of Fig. 5 becomes considerably simpler.

In brief summary it may be said that the system of the invention involves the production of signals which considered both on an instantaneous basis as well as over a long time average are highly accurate indicators of speed, drift and the true vertical. This instantaneous as well as long time accuracy is obtained by the interconnection of two systems neither one of which when utilized separately will produce the desired results or indeed a proportionate share of the results of the combined system, that is to say, the total results achieved by the combined system is greater than the sum of the results which might be obtained by utilizing each separately.

Signals representing speed and drift derived from a system using the Doppler principle for determining such quantities and which have a high accuracy when integrated over relatively long periods of time but which are inaccurate when relatively short intervals are considered are in effect constantly compared with signals derived from orthogonal accelerations which have good high frequency accuracy. The comparison of these two kinds of signals is utilized to produce error signals which constantly correct the output indications. The result is that the output indications are maintained at a high level of instantaneous accuracy. Additionally the outputs have a high degree of accuracy at intermediate frequencies, which degree of accuracy cannot be obtained by the sole use of either system of providing inputs.

Additionally the combined system of the invention permits the determination of the true vertical which is beyond the capabilities of either system of indications when used separately.

Finally the integrated system of the invention permits the introduction of corrections for sidereal earth rate and Coriolis acceleration so that extremely high accuracy may be maintained.

What is claimed is:

1. A navigation system comprising, means responsive to slowly varying input data for determining the speed of a vehicle, means responsive to rapidly varying input data for determining the speed of said vehicle, means for comparing said speed determinations to produce an error signal, and means for continuously correcting at least one of said speed determinations by said error signal.

2. A navigation system comprising, means responsive to slowly varying input data for determining the drift of a vehicle, means responsive to rapidly varying input data for determining the drift of said vehicle, means for comparing said drift determination to produce an error signal and means for continuously correcting at least one of said drift determinations by said error signal.

3. A navigation system comprising, means responsive to slowly varying input data but relatively unresponsive to rapidly varying input data for determining the speed of a vehicle, said means being self-contained on the vehicle, means responsive to rapidly varying input data but relatively unresponsive to slowly varying input data for determining the speed of said vehicle, both said means being self-contained on the vehicle, means for comparing said speed determinations to produce an error signal, and means for continuously correcting at least one of said speed determinations by said error signal to produce a navigational speed signal which is accurate at both high and low frequencies and more accurate at intermediate frequencies than either determining means.

4. A navigational system comprising, means responsive to slowly varying input data but relatively unresponsive to rapidly varying input data for determining the drift of a vehicle, said means being self-contained on the vehicle, means responsive to rapidly varying input data but relatively unresponsive to slowly varying input data for determining the drift of a vehicle, both said means being self-contained on the vehicle, means for comparing said drift determinations to produce an error signal, and means for continuously correcting at least one of said drift determinations by said error signal to produce a navigational drift signal which is accurate at both high and low frequencies and more accurate at intermediate frequencies than either determining means.

5. A navigational system comprising, means responsive to slowly varying input data but relatively unresponsive to rapidly varying input data for determining the speed and drift of a vehicle, said means being self-contained on the vehicle, means responsive to rapidly varying input data but relatively unresponsive to slowly varying input data for determining the speed and drift of a vehicle, both said means being self-contained on the vehicle, means for comparing said speed determinations to produce a speed error signal, means for comparing said drift determinations to produce a drift error signal, means for combining and compounding said speed and drift error signals, and means for continuously correcting at least one of said speed and drift determining means for said compound signal to produce navigational speed and drift signals which are accurate at both high and low frequencies and which are also more accurate at intermediate frequencies than either determining means, said means also inherently producing a highly accurate indication of the dynamic vertical direction.

6. A Doppler-inertial navigation system comprising, means for determining the speed and drift angle of a vehicle by the Doppler shift in frequency produced between radiated and reflected electromagnetic energy, means including inertial actuated means for determining the speed of said vehicle, means for comparing said speed determinations to produce a speed error signal means including inertial actuated means for determining the drift angle of said vehicle, means for comparing said drift angle determinations to produce a drift angle error signal, means for compounding said speed and drift angle error signals, and means for applying said compound error signal to at least one of said determining means and improve its accuracy.

7. A Doppler-inertial navigation system as defined in claim 6 including means for damping each of said error indications.

8. A Doppler-inertial navigation system comprising, means for deriving a first signal of amplitude proportional to the ground track speed of a vehicle from the Doppler shift in frequency produced between electromagnetic energy radiated from and reflected back to said vehicle, means including at least one inertial device for deriving a second signal representing ground track speed, means for comparing said first and second signals to produce an error signal, and means for controlling the output of said inertial device in accordance with a function of said error signal.

9. A Doppler-inertial navigation system comprising, means for deriving a first signal of amplitude proportional to the ground track speed of a vehicle from the Doppler shift in frequency produced between electromagnetic energy radiated from and reflected back to said vehicle, first inertial means producing a signal of amplitude proportional to acceleration of said vehicle in an arbitrary horizontal reference direction, means for integrating said last-mentioned signal, second inertial means producing a signal of amplitude proportional to acceleration of said vehicle in a horizontal direction normal to said arbitrary reference direction, means for integrating said last-mentioned signal, means for deriving from said two integrated signals a second signal representing ground track speed, means for comparing said first and second signals to produce an error signal, and means for controlling the outputs of said first and second inertial means in accordance with a function of said error signal.

10. A Doppler-inertial navigation system comprising, means for deriving a first signal of an amplitude proportional to the drift angle of a vehicle from the Doppler shift in frequency produced between electromagnetic energy radiated from and reflected back to said vehicle, means including at least one inertial device for deriving a second signal representing the angle between an arbitrary reference direction and the ground track of said vehicle, gyroscopic means for maintaining the attitude of said at least one inertial device constant relative to said arbitrary reference direction and for emitting an angle signal representing the angle between said arbitrary reference direction and the heading direction of said vehicle, means for algebraically adding said angle signal to said second signal to form an inertial drift angle signal, means for subtracting said inertial drift angle signal from said first signal to form an error signal, and means for applying said error signal to damp the outputs of said at least one inertial device and to correct said gyroscopic means.

11. A Doppler-inertial navigation system comprising, means for deriving a first signal of amplitude proportional to the ground track speed of a vehicle and a second signal of amplitude proportional to the drift angle of said vehicle, both said first and second signals being derived from the Doppler shift in frequency produced between electromagnetic energy radiated from and reflected back to said vehicle, first inertial means producing a signal of amplitude proportional to acceleration of said vehicle in an arbitrary reference direction, means for integrating said last-named signal, second inertial means producing a signal of amplitude proportional to the acceleration of said vehicle in a horizontal direction normal to said arbitrary reference direction, means for integrating said last-mentioned signal, means for deriving from said two integrated signals a third signal representing the angle between said arbitrary reference direction and the ground track of said vehicle, gyroscopic means for maintaining the attitude of said first and second inertial means constant relative to said arbitrary reference direction and for emitting an angle signal representing the angle between said arbitrary reference direction and the heading of said vehicle, means for algebraically adding said angle signal to said third signal to form an inertial drift angle signal, means for subtracting said inertial drift angle signal from said second signal to form a drift error signal, means for multiplying said drift error signal by said first signal to form a cross-track velocity error signal, and means for applying said cross-track velocity error signal to damp the output signals of said first and second inertial means and to correct said gyroscopic means.

12. A Doppler-inertial navigation system comprising, circuit means utilizing the Doppler phenomenon of shift in frequency between electromagnetic energy radiated from a vehicle and the echo energy reflected back thereto, said circuit means emitting a first signal proportional to the speed of the vehicle and a second signal proportional to the drift angle of the vehicle, inertial means for deriving an inertial third signal proportional to the speed of said vehicle and an inertial fourth signal proportional to the horizontal angle between the vehicle ground track and an arbitrary reference direction, means for producing a speed error signal from the comparison of said inertial third signal and said first signal, means for producing a drift angle error signal from the comparison of said inertial fourth signal and said second signal, means for producing from said speed error signal and said drift angle error signal a pair of orthogonal error signals, one being in said arbitrary reference direction and the other normal thereto, and means for controlling said inertial means thereby.

13. A Doppler-inertial navigation data system comprising, means for deriving a first signal of amplitude proportional to the ground track speed of a vehicle and a second signal of amplitude proportional to the drift angle of the vehicle, both said first and second signals being derived from the Doppler shift in frequency produced between electromagnetic energy radiated from and reflected back to said vehicle, first inertial means producing a signal of amplitude proportional to acceleration of said vehicle in an arbitrary reference direction, means for integrating said last-named signal, second inertial means producing a signal of amplitude proportional to the acceleration of said vehicle in a horizontal direction normal to said arbitrary reference direction, means for integrating said last-named signal, means for deriving from said two integrated signals a third signal representing the inertial ground track speed and a fourth signal representing the angle between said arbitrary reference direction and the vehicle ground track direction, means for subtracting said third signal from said first signal to form a speed error signal, gyroscopic means for maintaining the attitude of said first and second inertial means constant relative to said arbitrary reference direction and for emitting an angle signal representing the angle between said arbitrary reference direction and the heading of said vehicle, means for algebraically adding said angle signal to said fourth signal to form an inertial drift angle signal, means for subtracting said inertial drift angle signal from said second signal to form a drift error signal, means for multiplying said drift error signal by said first signal to form a cross track velocity error signal, means for resolving said cross track velocity error signal and said speed error signal in the arbitrary reference direction and the direction normal thereto to form two correction signals, and means for applying said two correction signals to damp the output signals of said first and second inertial means and correct said gyroscopic means.

14. A Doppler-inertial navigation system comprising, circuit means utilizing the Doppler phenomenon of shift in frequency of electromagnetic energy transmitted from a moving vehicle when reflected and received thereon, means for deriving first and second signals therefrom respectively proportional to the speed and drift angle of said vehicle, a horizontally maintained platform supported to have three degrees of freedom, a first accelerometer on said platform emitting a signal proportional to horizontal acceleration in an arbitrary reference direction, a second accelerometer on said platform emitting a signal proportional to horizontal acceleration normal to said reference direction, means for integrating, said signals, resolving means for deriving from said integrated signals an inertial speed signal proportional to vehicular speed and an inertial angle signal proportional to the angle between the vehicular ground track and said reference direction, means derived from said platform support for securing a signal representing the angle between the vehicular axis and said reference direction, a subtracting device subtracting said last named signal from said inertial angle signal to secure an inertial drift angle signal, a subtracting device subtracting said inertial drift angle signal from said second signal to secure a drift angle error signal, multiplying means for multiplying said drift angle error signal by said first signal to secure a cross-track velocity error signal, a subtracting device subtracting said inertial speed signal from said first signal to secure a speed error signal, a resolver having applied thereto said speed error signal and said cross-track velocity error signal and producing therefrom a $y$ correction signal representing said platform error in the reference direction and an $x$ correction signal representing said platform error in the cross-reference direction, a first gyroscope on said platform responsive to platform rotation about a direction normal to said reference direction, means controlled by said first gyroscope for maintaining horizontality of said platform in said reference direction, a second gyroscope on said platform responsive to platform rotation about said reference direction, means controlled by said second gyroscope for maintaining horizontality of said platform in the cross-reference direction, a connection from said resolver applying said $y$ and $x$ correction signals to precess said first and second gyroscopes respectively to correct for gyroscopic drift, an adding device connecting said resolver to add said $y$ correction signal to the output of said first accelerometer as a damping signal, and an adding device connecting said resolver to add said $x$ correction signal to the output of said second accelerometer as a damping signal.

15. A Doppler-inertial navigation system in accordance with claim 14 including a platform support angle indicator sensitive to departures from horizontality of the platform about said vehicular axis, and a second platform support angle indicator sensitive to departures from horizontality of the platform along said vehicular axis, said indicators together indicating the dynamic vertical direction from said moving vehicle.

16. A Doppler-inertial navigation system as defined in claim 14 including means for producing a pair of signals whose values are representative of components in the reference and cross-reference directions of Coriolis error, means for adding the signal representing the reference direction component to the output signal of said first accelerometer, and means for adding the signal representing the cross-reference direction component to the output signal of said second accelerometer.

17. A Doppler-inertial navigation system as defined in claim 14 including means for producing a pair of signals whose values are functions of sidereal earth rotational rate, and means for adding respective ones of said pair of signals to respective ones of said $y$ and $x$ correction signals applied to precess said first and second gyroscopes.

18. A Doppler-inertial navigation system comprising, a gimbal suspension having one axis of rotation positioned in a direction parallel to the axis of a vehicle and its other axis of rotation positioned in a horizontal plane and normal to said first axis, a platform, means supporting said platform in said gimbal suspension for rotation about an axis normal to the axes of rotation thereof, means for maintaining said platform aligned about said normal axis in an arbitrary fixed direction, a pair of gyroscopes each having a single degree of freedom mounted on said platform with their axes at right angles to each other, each of said gyroscopes including means for producing a signal proportional to the deflection thereof in a vertical plane, resolver means having said signals applied thereto and producing therefrom a pair of stabilizing signals each of which is respectively proportional to the angular deflection of said gimbal suspension about a respective axis of rotation, means operated by said stabilizing signals for rotating said gimbal suspension about its axes in a direction opposed to said deflection, a pair of accelerometers each sensitive to accelerations in only a single direction mounted on said platform at right angles to each other, means for orienting said accelerometers so that one of said pair is sensitive to accelerations along said arbitrary fixed direction and produces a first signal proportional thereto, and the other thereof is sensitive to accelerations in a direction perpendicular to said arbitrary fixed direction and produces a second signal proportional thereto, circuit means utilizing the Doppler phenomenon of frequency shift between radiated and reflected energy, said circuit means emitting a Doppler speed signal proportional to the speed of said vehicle and a Doppler drift signal proportional to the drift angle of said vehicle, means for integrating said first and second signals, arc tangent solver means for producing from said integrated first and second signals, a signal representing inertially secured velocity of said vehicle along its ground track and a signal representing the angle between said arbitrary fixed direction and the vehicular ground track, means for subtracting from said last named signal a signal representing the angle between said arbitrary fixed direction and said vehicular axis to form a signal representing inertially secured drift angle, means for producing a drift error signal by the comparison of said inertially secured drift angle signal and said Doppler drift signal, means for multiplying said drift error signal by a velocity signal to secure a cross track velocity error signal, means for securing from said Doppler speed signal and from said signal representing inertially secured velocity a ground speed error signal, means for coordinate-shifting said cross track velocity error signal and said ground speed error signal to form a pair of error signals in said arbitrary fixed direction and perpendicular thereto, and means for applying said pair of error signals as zero level reference signals to said pair of gyroscopes and as damping signals to the outputs of said pair of accelerometers.

References Cited in the file of this patent

UNITED STATES PATENTS

| | | |
|---|---|---|
| 2,371,626 | Kecskemeti | Mar. 20, 1945 |
| 2,577,061 | Woolson et al. | Dec. 4, 1951 |
| 2,591,697 | Hays | Apr. 8, 1952 |
| 2,613,071 | Hansel | Oct. 7, 1952 |
| 2,619,623 | Meredith | Nov. 25, 1952 |
| 2,676,770 | Schuck | Apr. 27, 1954 |